Figure 1:
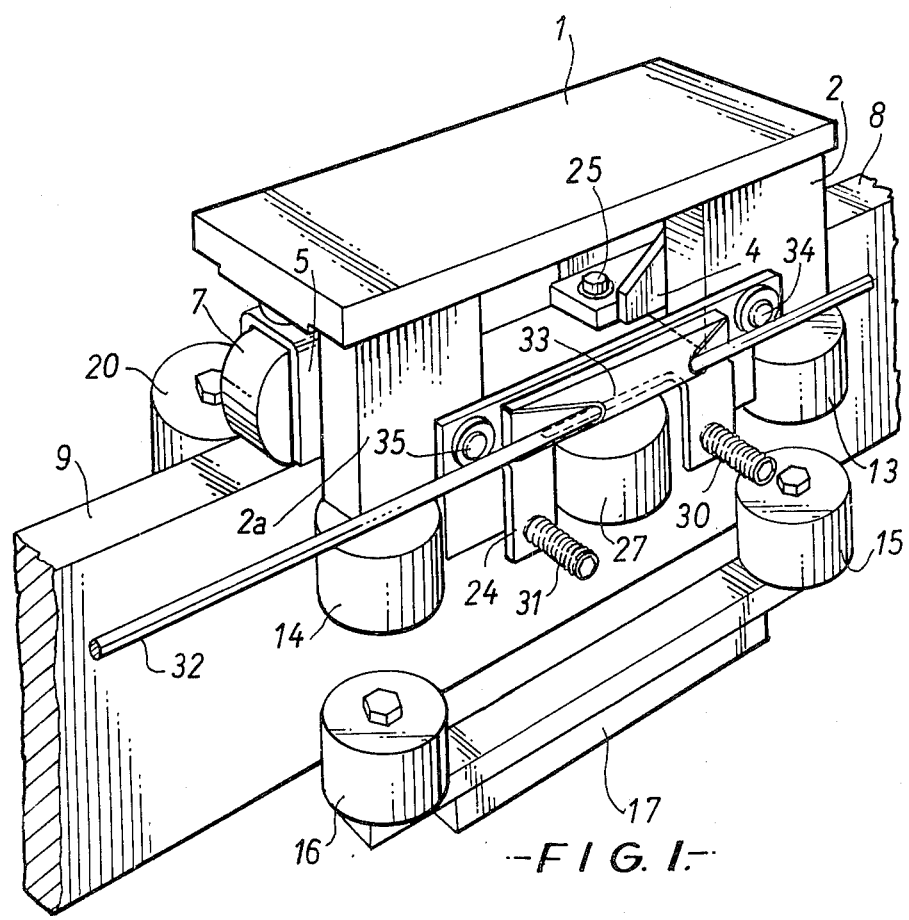

United States Patent [19]
Shortridge et al.

[11] 3,902,432
[45] Sept. 2, 1975

[54] TROLLEYS

[75] Inventors: Douglas Shortridge; Peter Mitchell, both of Leeds, England

[73] Assignee: Rizzi Limited, Leeds, England

[22] Filed: Aug. 19, 1974

[21] Appl. No.: 498,426

[30] Foreign Application Priority Data
Sept. 24, 1973 United Kingdom............ 44710/73

[52] U.S. Cl. .................. 105/150; 105/154; 104/93
[51] Int. Cl.² ..................................... B61B 03/00
[58] Field of Search ..................... 104/89, 93–95,
104/106, 107, 118–120, 172 S; 105/156,
154, 150, 144, 141

[56] References Cited
UNITED STATES PATENTS
3,055,314  9/1962  Cox.................................. 105/150
3,092,040  6/1963  Bingham........................... 105/150
3,220,629  11/1965  Anderson....................... 105/156 X Primary Examiner—Lloyd L. King
Assistant Examiner—John J. Love
Attorney, Agent, or Firm—Stevens, Davis, Miller & Mosher

[57] ABSTRACT

A trolley for running along a rail has two castor-mounted upper supporting wheels for engaging the top edge of the rail and a set of four guide wheels engaging each face of the rail. A steering control wheel, mounted on a bracket, is biased so as to be maintained in contact with the rail. The bracket is connected to the castors so that the trolley will negotiate curves without any slipping of the supporting wheels.

5 Claims, 5 Drawing Figures ably the longitudinal spacing of the guide wheels is
TROLLEYS

This invention relates to trolleys supported by wheels engaging the top edge of a rail.

According to the invention a trolley comprises a framework carrying two longitudinally spaced upper supporting wheels each rotatably mounted on a castor pivotally supported by the framework, the pivotal axes of the two castors lying in a first common plane; a first set of four guide wheels comprising two longitudinally spaced upper wheels and two longitudinally spaced lower wheels, the axes of all four guide wheels of the first set lying in a second common plane parallel to the first common plane; a second set of four guide wheels comprising two longitudinally spaced upper wheels and two longitudinally spaced lower wheels, the axes of all four guide wheels of the second set lying in a third common plane parallel to the first common plane; a bracket mounted to be slidable transversely of the framework, and connected to the castors to cause pivotal movement thereof; a steering control wheel rotatably mounted on the bracket about an axis parallel to the first common plane and lying longitudinally between the upper wheels of the first set of guide wheels; and means biasing the steering control wheel and bracket towards the second set of guide wheels.

The trolley is particularly suitable for use on a curved rail with the curved sections all concave to a single side of the rail, e.g. a closed loop circular or oval circuit.

In use the trolley may be placed on a rail with the two upper supporting wheels engaging the top edge of the rail, the first set of guide wheels and steering control wheel engaging one face of the rail, and the second set of guide wheels engaging the other face of the rail. As the trolley moves from a straight section to a curved section of the rail and vice versa the biasing means will act to maintain the steering control wheel in contact with the rail, so causing a sliding movement of the bracket and a pivotal movement of the castors. The connection between the bracket and the castors is such that the castors pivot to cause the upper supporting wheels to turn into the curve so that they run round the curve without slipping. The invention thus provides a trolley which will run smoothly around a closed loop circuit.

The trolley may be designed so that the steering control wheel engages either the face of the rail having concave sections or the face having convex sections.

Preferably all the guide wheels have their axes fixed relative to the framework and the longitudinal distances between the upper wheels and between the lower wheels of the first set of guide wheels are less than the longitudinal distances between the upper wheels and between the lower wheels of the second set of guide wheels. These distances should desirably be chosen with regard to the curvature of the track. Ideally the trolley should be used with track wherein all curved sections have the same radius of curvature, and the guide wheels so set that a plane containing the axes of the upper and lower guide wheels of both sets at each end of the trolley makes an angle with a plane transverse of the trolley equal to half the angle made between such transverse plane and a plane radial of the curved section of the track and including the point of contact of the castor with the track at the respective end of the trolley.

Figure 2:
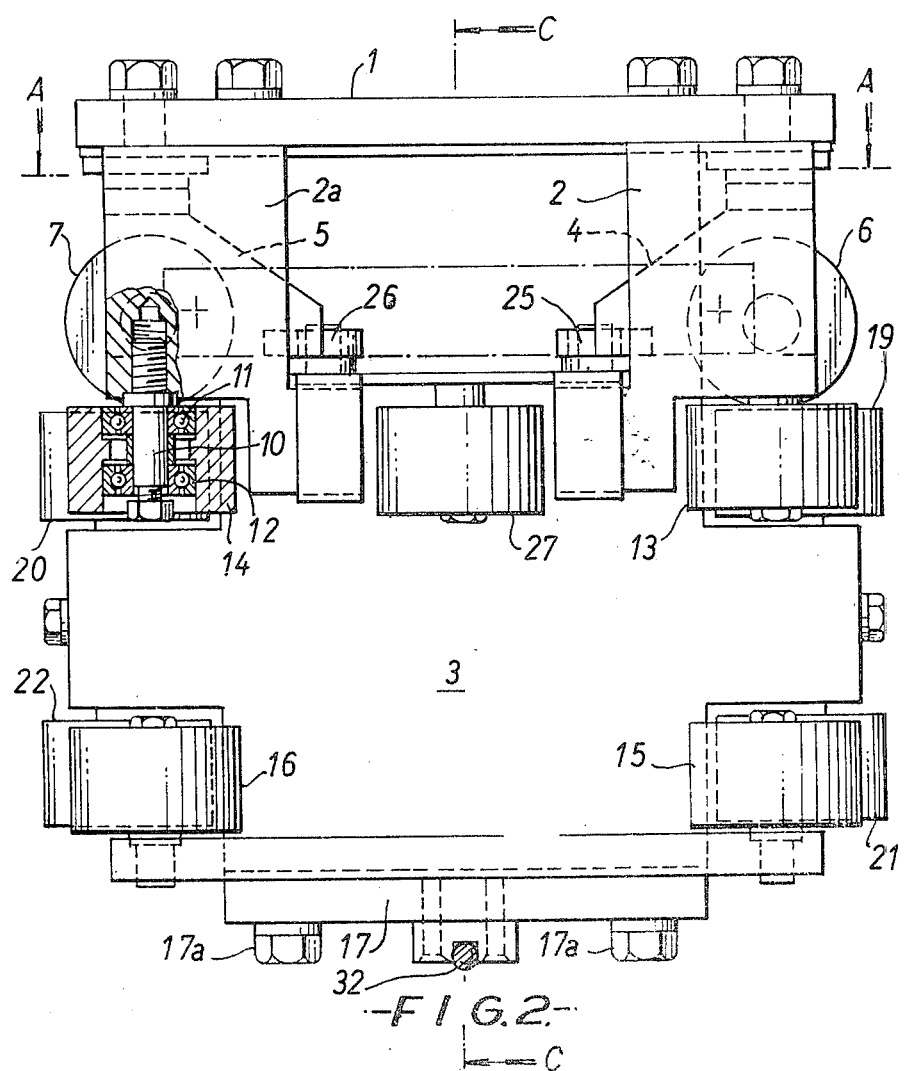
Figure 3:
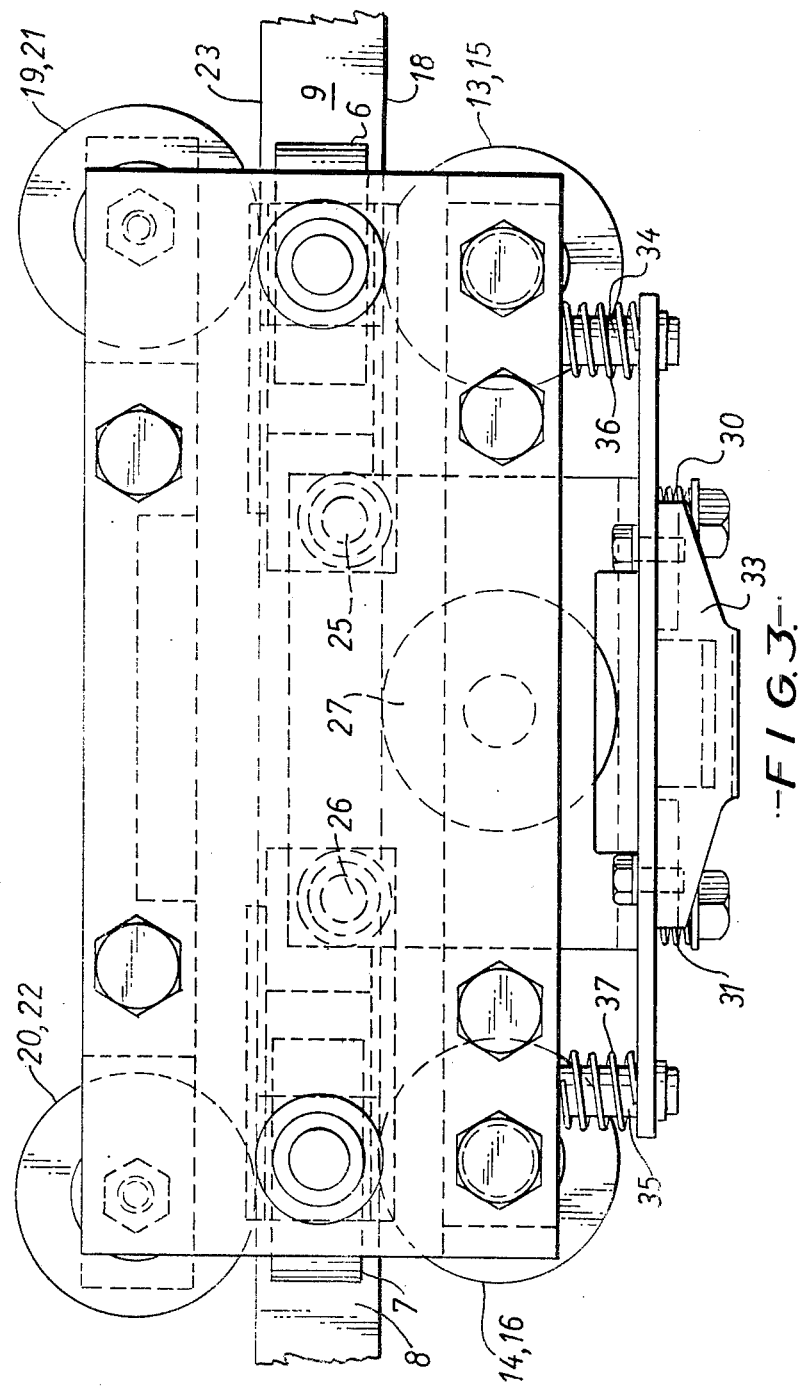
Figure 4:
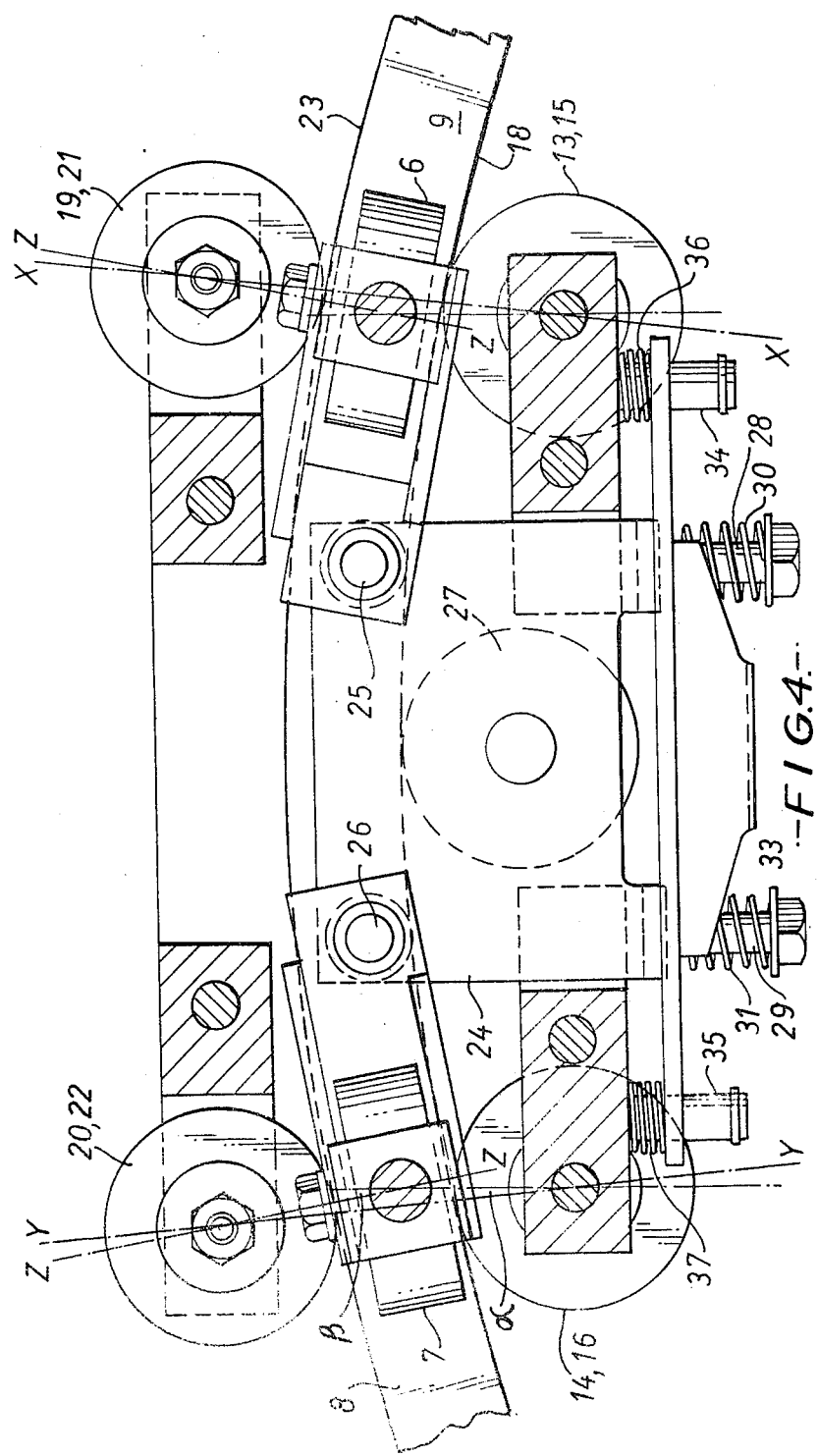
Figure 5:
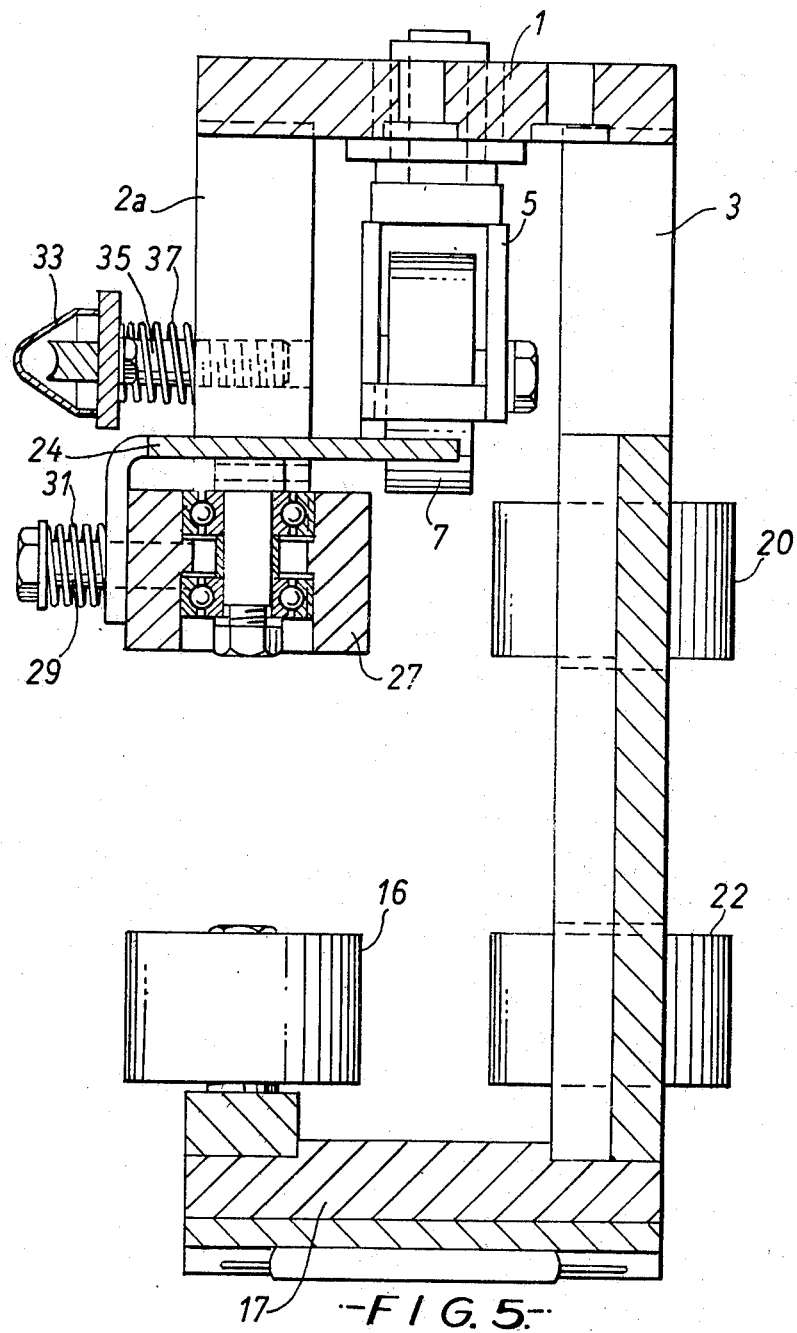

An example of a trolley according to the invention will now be described in more detail, by way of example only, with reference to the accompanying drawings in which:

FIG. 1 is a perspective view of the trolley;
FIG. 2 is a side elevation of the trolley;
FIG. 3 is a plan view of the trolley when negotiating a straight track section;
FIG. 4 is a section on Line A—A of FIG. 2 showing the trolley when negotiating a curved track section; and
FIG. 5 is a section on Line C—C of FIG. 2.

The trolley comprises a framework comprising a top plate 1, two first side plates 2, 2a and a second side plate 3. Two castors 4, 5 are pivotally mounted on the top plate 1 and each has rotatably mounted thereon an upper supporting wheel 6, 7 engageable with the top edge 8 of a rail 9 on which the trolley runs. Each side plate 2, 2a carries a spindle such as 10 carrying bearings 11, 12 on which runs an upper guide wheel 13, 14 respectively of a first set of guide wheels. Only the bearing arrangement for guide wheel 14 is shown, that for wheel 13 being similar. This first set of guide wheels also includes two lower guide wheels 15, 16 supported by bearings on spindles secured to a cross-member 17 secured to side plate 3 by bolts 17a. All four guide wheels of this first set engage a first face 18 of the rail 9.

A second set of guide wheels is supported by spindles and bearings from side plate 3. This second set comprises upper guide wheels 19, 20 and lower guide wheels 21, 22 and these four wheels engage a second face 23 of the rail 9.

As is best seen from FIGS. 3 and 4 the longitudinal spacing between wheels 19 and 20 and wheels 21 and 22 of the second set is greater than that between wheels 13 and 14 and 15 and 16 of the first set. The trolley is ideally designed for use with a track having a single radius of curvature in the curved sections thereof and desirably the longitudinal spacing of the guide wheels is such that planes X—X (containing the axes of wheels 13, 15, 19 and 21) and Y—Y (containing the axes of wheels 14, 16, 20 and 22) each make an angle $\alpha$ with a plane transverse of the trolley that is equal to half the angle $\beta$ made between such a transverse plane and a plane Z—Z lying radially of the curved track section and including the point of contact of the castor 6 or 7 with the track at the respective end of the trolley.

The trolley includes a bracket 24 which is slidable transversely of the framework and which is pivotally connected at 25, 26 to the two castors 4 and 5. The bracket has a steering control wheel 27 rotatable mounted thereon, the wheel 27 lying longitudinally between wheels 13, 14 and engaging the face 18 of rail 9. The bracket is slidably mounted on guide pins 28 and 29. Compression springs 30, 31 coiled around pins 28, 29 bias the bracket towards the rail 9.

The trolley may be driven along the rail by a cable 32 to which the trolley is secured by a clip 33. The clip is secured to a plate slidably mounted on guide pins 34, 35. Compression springs 36, 37 coiled around pins 34, 35 bias the plate away from the body of the trolley. This allows necessary movement of the clip 33 relative to the body of the trolley as curves are negotiated. The clip is readily releasable so that trolleys may be removed from the rail by releasing the clip, removing the cross-member 17 by removing bolts 17a and lifting the trolley from the rail.

In use, when travelling along a straight section of track the parts of the trolley are as shown in FIG. 3, with all guide wheels and the steering control wheel running in contact with the respective side faces of the track. As the trolley moves on to a curved section of track the guide wheels maintain their contact with the track because of their spacing in accordance with the radius of curvature. Springs 34, 35 move the steering control wheel to keep this in contact with the track and this causes a sliding movement of the bracket 24 towards the rail. This movement of the bracket causes pivoting of the castors to cause the supporting wheels 6, 7 to turn into the curve as shown in FIG. 4. The trolley is thus steered round the curve with little or no slipping of any of the wheels on the rail, so ensuring smooth travel.

Although the trolley has been shown with the steering control wheel running in contact with the concave side of the track it will be obvious that this may be positioned to engage the convex side of the track, with appropriate modification. Other detail changes can be made.

What we claim is:

1. A trolley comprising a framework carrying two longitudinally spaced upper supporting wheels each rotatably mounted on a castor pivotally supported by the framework, the pivotal axes of the two castors lying in a first common plane; a first set of four guide wheels comprising two longitudinally spaced upper wheels and two longitudinally spaced lower wheels, the axes of all four guide wheels of the first set lying in a second common plane parallel to the first common plane; a second set of four guide wheels comprising two longitudinally spaced upper wheels and two longitudinally spaced lower wheels, the axes of all four guide wheels of the second set lying in a third common plane parallel to the first common plane; a bracket mounted to be slidable transversely of the framework, and connected to the castors to cause pivotal movement thereof; a steering control wheel rotatably mounted on the bracket about an axis parallel to the first common plane and lying longitudinally between the upper wheels of the first set of guide wheels; and means biasing the steering control wheel and bracket towards the second set of guide wheels.

2. A trolley according to claim 1 wherein all the guide wheels have their axes fixed relative to the framework and the longitudinal spacings between the wheels of the first set is less than those between the wheels of the second set.

3. A trolley according to claim 2 for use with a curved track wherein all curved sections have the same radius of curvature and the positions of the guide wheels are such that a plane containing the axes of the upper and lower guide wheels of both sets at each end of the trolley makes an angle with a plane transverse of the trolley equal to half the angle made between such transverse plane and a plane radial of the curved section of the track and including the point of contact of the castor with the track at the respective end of the trolley.

4. A trolley according to claim 1 wherein a clip is provided for attaching the trolley to a cable by which the trolley may be driven along a track.

5. A trolley according to claim 4 wherein the clip is mounted for limited transverse movement relative to the trolley to accomodate for movement of the trolley along a curved section of the track.

* * * * *